United States Patent
Jarrar et al.

(10) Patent No.: US 9,806,019 B2
(45) Date of Patent: Oct. 31, 2017

(54) INTEGRATED CIRCUIT WITH POWER SAVING FEATURE

(71) Applicant: FREESCALE SEMICONDUCTOR, INC., Austin, TX (US)

(72) Inventors: Anis M. Jarrar, Austin, TX (US); David R. Tipple, Austin, TX (US); Jeff L. Warner, Austin, TX (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 14/860,901

(22) Filed: Sep. 22, 2015

(65) Prior Publication Data

US 2017/0084535 A1    Mar. 23, 2017

(51) Int. Cl.
| | |
|---|---|
| *H01L 23/522* | (2006.01) |
| *H01L 27/092* | (2006.01) |
| *H01L 21/8238* | (2006.01) |
| *H01L 27/06* | (2006.01) |
| *H01L 23/485* | (2006.01) |
| *G06F 17/50* | (2006.01) |
| *H01L 23/528* | (2006.01) |
| *H01L 27/02* | (2006.01) |

(52) U.S. Cl.
CPC ...... *H01L 23/5228* (2013.01); *G06F 17/5077* (2013.01); *H01L 21/823871* (2013.01); *H01L 23/485* (2013.01); *H01L 23/5286* (2013.01); *H01L 27/0207* (2013.01); *H01L 27/0629* (2013.01); *H01L 27/0688* (2013.01); *H01L 27/092* (2013.01); *G06F 2217/78* (2013.01)

(58) Field of Classification Search
CPC ............... H01L 23/5228; H01L 27/092; H01L 21/823871; H01L 23/528; H01L 23/5226; H01L 23/5286; H01L 27/0629; H01L 27/0688; H01L 23/485
USPC ........ 257/337, 357, 360, 369, 379, 358, 363
See application file for complete search history.

(56) References Cited

U.S. PATENT DOCUMENTS

| | | | |
|---|---|---|---|
| 4,948,747 A * | 8/1990 | Pfiester | H01L 28/20 257/538 |
| 5,815,029 A | 9/1998 | Matsumoto | |
| 6,744,659 B1 | 6/2004 | Eby et al. | |
| 7,314,788 B2 | 1/2008 | Shaw et al. | |
| 9,276,140 B1 * | 3/2016 | Tam | H01L 31/02002 |
| 2001/0033003 A1* | 10/2001 | Sawahata | H01L 27/0266 257/355 |
| 2007/0180419 A1 | 8/2007 | Sherlekar et al. | |
| 2007/0210405 A1 | 9/2007 | Tsutsumi | |
| 2009/0045480 A1 | 2/2009 | Matsunaga et al. | |

(Continued)

FOREIGN PATENT DOCUMENTS

| | | | |
|---|---|---|---|
| JP | 11183507 A | * | 7/1999 |
| JP | 2007122814 | | 5/2007 |

(Continued)

*Primary Examiner* — Shouxiang Hu

(57) ABSTRACT

An integrated circuit includes a first transistor including a first current electrode, a second current electrode, and a bulk tie; a first conductive line coupled between the first current electrode and a first supply voltage; and a second conductive line coupled to the second current electrode. A resistance of the second conductive line is at least 5 percent greater than a resistance of the first conductive line. The bulk tie is coupled to a second supply voltage. The first supply voltage is different than the second supply voltage.

13 Claims, 3 Drawing Sheets

(56) References Cited

U.S. PATENT DOCUMENTS

| | | | | |
|---|---|---|---|---|
| 2010/0277150 | A1* | 11/2010 | Nagata | G01R 31/2884 323/282 |
| 2012/0249182 | A1 | 10/2012 | Sherlekar | |
| 2016/0276265 | A1* | 9/2016 | Iwabuchi | H01L 23/5223 |

FOREIGN PATENT DOCUMENTS

| | | |
|---|---|---|
| JP | 3970414 | 9/2007 |
| JP | 4463946 | 5/2010 |

* cited by examiner

US 9,806,019 B2

INTEGRATED CIRCUIT WITH POWER SAVING FEATURE

BACKGROUND

Field

This disclosure relates generally to integrated circuits, and more particularly, to integrated circuits with a power saving feature.

Related Art

Power savings continues to be a significant desire for integrated circuits including those that have high performance requirements such as processors and system on a chip (SoC) devices. The reduction in power usage can be desirable in a variety of applications which may or may not be a situation in which a battery is a source of power. For example, The amount of current can affect the size or character, such as conductivity, of the current carrying structure. Heat generation can be a significant issue as well. Dissipating heat can require significant extra structure such as fans and heat sinks. Also, there may be requirements relating to difficult environmental conditions at which current must be able to be dissipated. Those environmental conditions can create a situation in which undesirable current, such as leakage current, can be greatly increased from normal operations.

Accordingly, there is a need for further improvements in controlling current in an integrated circuit.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In one aspect, a resistance between a current electrode of a transistor and a power supply terminal results in a reduction in heat dissipation by reducing the off-state conduction of current through the transistor by increasing the threshold voltage with increases in current. This is better understood by reference to the drawings and the following description.

Figure 1:
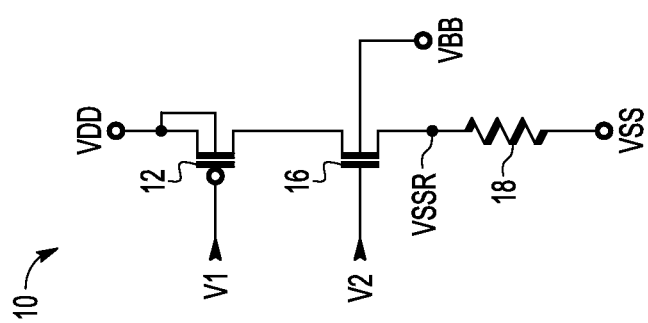
FIG. 1 is a circuit which benefits from reduced leakage current.

Shown in FIG. 1 is a circuit 10 of an integrated circuit. Circuit 10 has a P channel transistor 12, an N channel transistor 16, and a resistance 18. Transistor 12 has a first current electrode connected to a positive power supply terminal VDD, a control electrode for receiving a signal V1, a well tie connected to positive power supply terminal VDD, and a second current electrode. A well tie may also be called a bulk tie. Transistor 16 has a first current electrode connected to the second current electrode of transistor 12, a control electrode for receiving a signal V2, a second current electrode connected to a voltage node VSSR, and a substrate tie connected to a power supply terminal VBB. In typical operation, a resistance from a power supply terminal VDD, typically for receiving a positive power supply voltage, to a circuit is the same as the resistance from a power supply terminal VSS, commonly ground but typically at least negative relative to VDD. In this case, in addition to these typical resistances which are equal, there is a further resistance 18 which is achieved to reduce power consumption in the situation where the reduction is particularly beneficial. The first current electrode of transistor 12 and the second current electrode of transistor 16 are coupled as sources, while the second current electrode of transistor 12 and the first current electrode of transistor 16 are coupled as drains. The control electrodes are implemented with gates of transistors 12 and 16.

Figure 2:
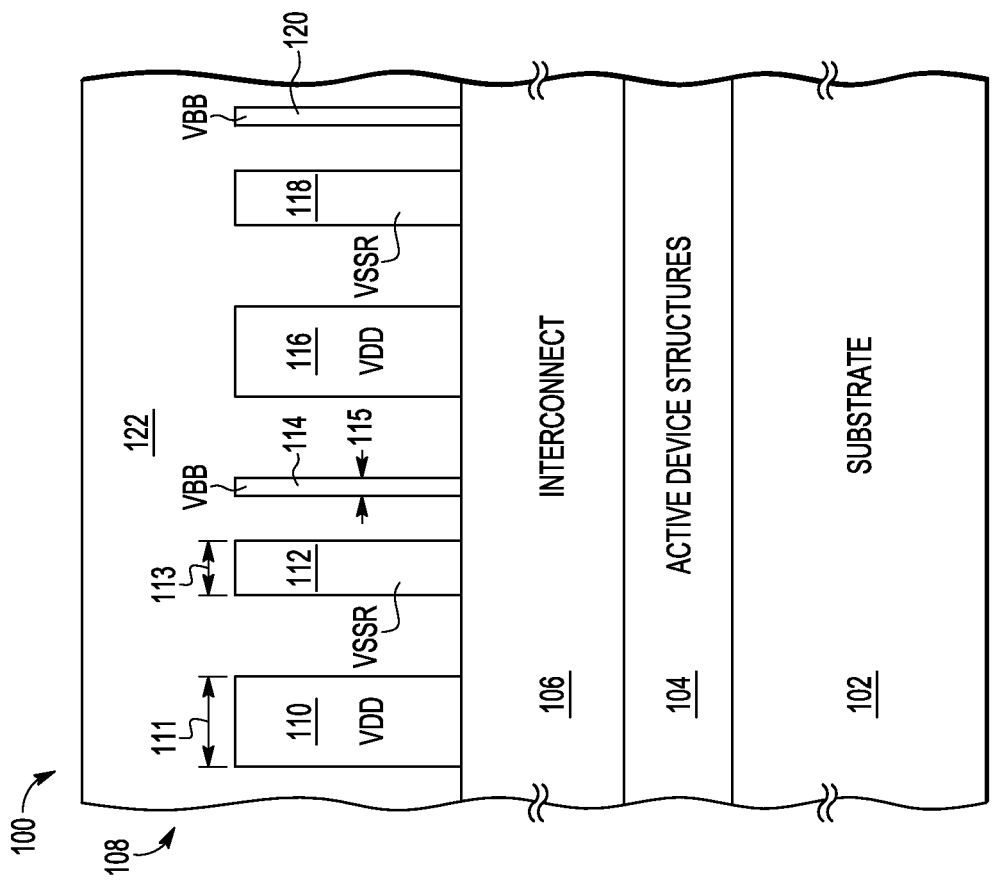
FIG. 2 is a cross section of a portion of an integrated circuit that includes a power distribution grid structure that benefits the circuit of FIG. 1.

Shown in FIG. 2 is an integrated circuit 100 in which circuit 10 of FIG. 1 is present. Integrated circuit 100 comprises a substrate 102, an active device structure region 104 in a portion of and over substrate 102, an interconnect region 106 over active device structure region 104, and a power supply distribution structure 108 over interconnect region 106. Power supply distribution structure 108 comprises a VDD conductor 110 having a width 111, a VSSR conductor 112 having a width 113, a VBB conductor 114 having a width 115, a VDD conductor 116 having a width the same as VDD conductor 110, a VSSR conductor 118 having a width the same as VSSR conductor 112, and a VBB conductor having a width the same as the width of VBB conductor 114. Conductors 110, 112, 114, 116, 118, and 120 have substantially the same height and are covered by an interlayer dielectric 122. Power supply distribution structure 108 is a metal layer with a major purpose of providing power to the circuits of integrated circuit 100. Routing of power generally is achieved by similar lengths of conductive material of VDD and VSS to any given circuit. Routing of VBB is not as sensitive because very little current flows from VBB. Conductors carrying VDD and VSS, on the other hand, carry significantly more current. Width 113 is less than width 111 so that more resistance is present for carrying VSS than for carrying VDD. This greater resistance is represented by resistance 18 and voltage VSSR is thus greater than voltage VSS. This is using typical terminology in which VDD is for a positive power supply voltage and VSS is for voltage that is negative with respect to the voltage at VDD. This could be reversed in a different situation so that VDD and VSS could be reversed. An effective amount of resistance differential may be as small as 5%. A greater differential such as 10% may be more effective. There may be tradeoffs that come into play that may limit the effectiveness as the differential becomes greater. But significantly higher differentials such as 30% or even more may be found to be effective.

Figure 3:
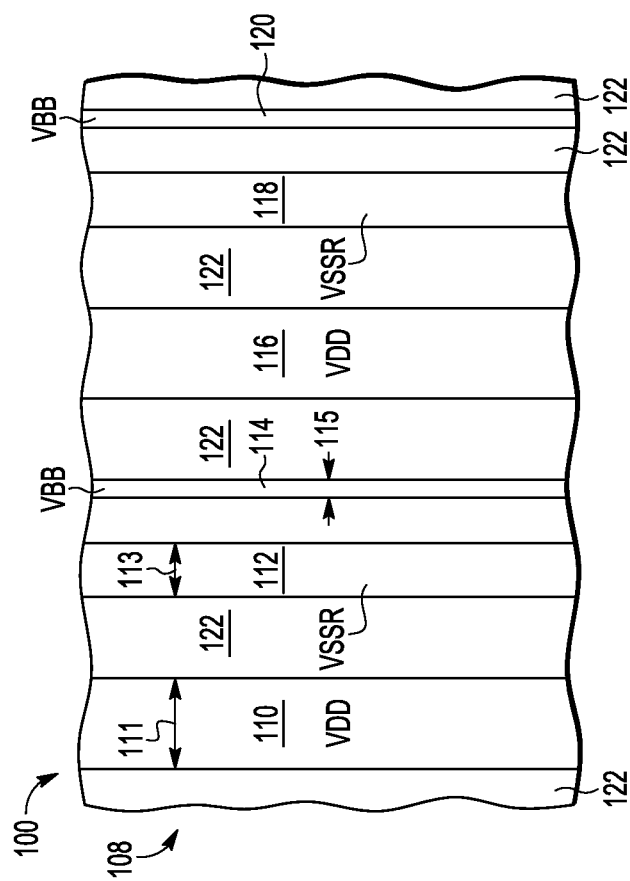
FIG. 3 is a top view of the portion of the integrated circuit of FIG. 2.

Shown in FIG. 3 is a top view of power supply distribution structure 108 showing conductors 110, 112, 114, 116, 118, and 120 as parallel power buses running as conductive lines over integrated circuit 100.

Figure 4:
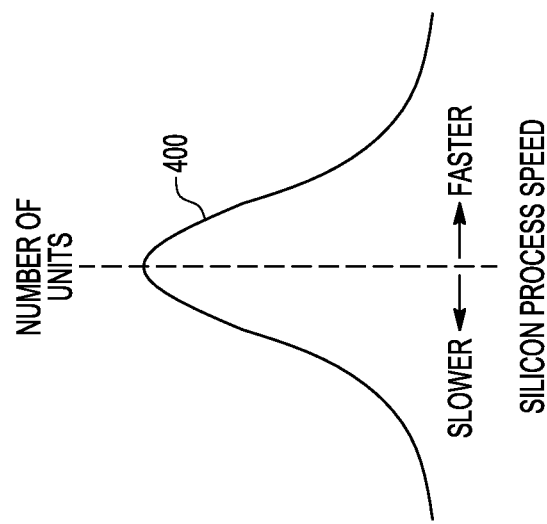
FIG. 4 is a speed distribution of an integrated circuit that includes the features of FIGS. 1-3.

Shown in FIG. 4 is a distribution 400 of many integrated circuits having the same design and construction relative to speed capability as integrated circuit 100. The faster the speed of the integrated circuit is, the higher the leakage current is. The speed capability correlates to lower threshold voltage. Thus the integrated circuits with higher speed capability, which are designated as faster in FIG. 4 tend to consume more power than the ones designated as slower in FIG. 4. This difference is reduced by resistance 18.

In operation, with the reduced width of the VSSR conductors, conductors 112 and 118, the resistance is higher than for the VDD conductors as designated by resistance 18. As current flows through resistance 18 the voltage on the second current electrode, which is a source of transistor 16, increases. The increase in source voltage, while the body tie remains at VSS, causes a voltage differential between the body tie and the source which has the effect of increasing the threshold voltage of transistor 16. The increase in threshold voltage causes a decrease in current for a given voltage of input signal V2. Also the voltage increase of voltage VSSR decreases the drain to source voltage which also decreases current. For a faster device and its attendant lower threshold voltage, the current tends to be higher but that causes an even greater increase in threshold voltage and reduced drain to source voltage. Thus, the faster devices have more current flow but the amount more is reduced by the increase in voltage on the source. This effect of resistance 18 is significantly less on the slower devices thus the effect of resistance 18 causes a reduced differential in the current thorough faster devices and slower devices. The back bias voltage of VBB is unchanged because it is isolated from VSS and there is minimal loading due to being connected to only body ties.

Figure 5:
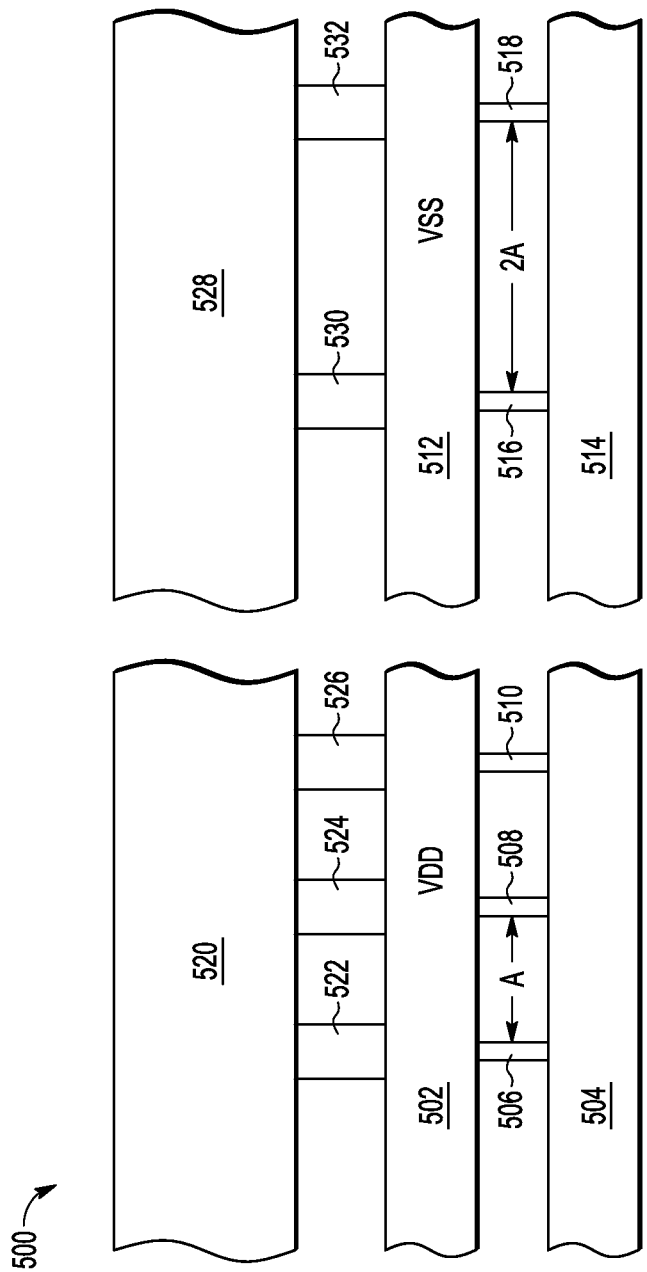
FIG. 5 shows an alternative or addition to the structure of FIGS. 2 and 3.

Shown in 5 is a further approach for forming resistance 18 using a reduced number of vias in routing conductive lines such as VSS to circuits. Shown in FIG. 5 is a structure 500 in which an upper conductor layer 502 provides VDD to a lower conductor layer using three vias 506, 508, and 510 spaced apart by a distance A. Also shown in FIG. 5 is an upper conductor layer 512 that provides VSS to a lower conductor layer 504 in route to a circuit such as circuit 10. With fewer vias, the resistance between conductor layer 512 and conductor layer 514 is greater than between conductor layer 502 and conductor layer 504. Thus the resistance differential represented by resistance 18 can be achieved or enhanced by reducing the number of vias. A further conductor layer 520 is above conductor layer 502 and connected by vias 522, 524, and 526 to conductor layer 502. Similarly a further conductor layer 528 is above layer 512 and is connected by vias 530 and 532 to layer 512. Layer 520 is significantly thicker than conductor layer 502 and vias 522, 524, and 526 are significantly of larger diameter than that of vias 506, 508, and 510. Similarly, layer 528 is significantly thicker than layer 512 and vias 530 and 532 are of significantly larger diameter than that of vias 516 and 518.

Thicker conductor layers 520 and 528 are used for global power and ground distribution, respectively, whereas thinner conductor layers 502 and 512 are used for local power and ground distribution, respectively. Depending on the amount of desired resistance in the grid, the scaling of vias 506, 508, 510, 516, 518, 522, 524, 526, 530, and 532 may differ from that shown and may occur at the lower thinner layer connections, at the thicker layer connections, a combination thereof.

Thus it is shown that varying the conductor layers and/or the vias to tune the resistance of the grid is achievable and beneficial in increasing the threshold voltage in the proper situation to reduce leakage current, for example.

By now it should be appreciated that there has been described an integrated circuit including a first transistor including a first current electrode, a second current electrode, and a bulk tie. The integrated circuit further includes a first conductive line coupled between the first current electrode and a first supply voltage. The integrated circuit further includes a second conductive line coupled to the second current electrode, wherein a resistance of the second conductive line is at least 5 percent greater than a resistance of the first conductive line, wherein the bulk tie is coupled to a second supply voltage, and the first supply voltage is different than the second supply voltage. The integrated circuit may have a further characterization by which the resistance of the second conductive line is at least 5 percent greater than the resistance of the first conductive line due to a width of the second conductive line being less than a width of the first conductive line. The integrated circuit may have a further characterization by which the resistance of the second conductive line is at least 5 percent greater than the resistance of the first conductive line due to a number of conductive vias coupled to the second conductive line being less a number of conductive vias coupled to the first conductive line. The integrated circuit may have a further characterization by which the first transistor is an N-channel metal oxide semiconductor, the first current electrode is a drain electrode, the second current electrode is a source electrode, and a magnitude of the first supply voltage is greater than a magnitude of the second supply voltage. The integrated circuit may have a further characterization by which the first transistor is a P-channel metal oxide semiconductor, the first current electrode is a source electrode, the second current electrode is a drain electrode, and a magnitude of the first supply voltage is greater than a magnitude of the second supply voltage. The integrated circuit may have a further characterization by which a second transistor including a first current electrode and a second current electrode, a third conductive line coupled between the first current electrode of the second transistor and the first supply voltage, wherein the first conductive line is further coupled to the second current electrode of the second transistor. The integrated circuit may have a further characterization by which the first and second conductive lines are formed in a power metal layer of the integrated circuit. The integrated circuit may have a further characterization by which the first and second conductive lines have a same thickness. The integrated circuit may further include a substrate, active electronic device structures formed on the substrate, and one or more interconnect layers coupled to the active electronic device structures, wherein the first and second conductive lines are formed over the one or more interconnect layers. The integrated circuit may have a further characterization by which a width of a conductive line coupled to the bulk tie is less than a width of the first conductive line and a width of the second conductive line.

Also described is a method including forming a transistor in an active device layer of an integrated circuit, wherein the transistor includes a first current electrode, a second current electrode and a bulk tie. The method further includes forming interconnect structures in an interconnect layer of the integrated circuit. The method further includes forming a first conductive line in a power metal layer of the integrated circuit, wherein the first conductive line is coupled to the first current electrode by a first set of the interconnect structures. The method further includes forming a second conductive line in the power metal layer of the integrated circuit, wherein the second conductive line is coupled to the second current electrode by a second set of the interconnect structures, wherein a resistance of the second conductive line is greater than a resistance of the first conductive line to generate a bias voltage at the second current electrode that is proportional to current through the second conductive line. The method may have a further characterization by which a width of the second conductive line is at least 5 percent less than a width of the first conductive line. The method may have a further characterization by which a number of interconnect structures in the first set of the interconnect structures is greater than a number of interconnect structures in the second set of the interconnect structures. The method may further include forming a second transistor in the active device layer and forming a third conductive line in the power metal layer of the integrated circuit, wherein the third conductive line is coupled to a first current electrode of the second transistor by a third set of the interconnect structures, wherein the first conductive line is coupled to a second current electrode of the second transistor. The method may have a further characterization by which the forming interconnect structures includes forming a third set of interconnect structures coupled to the third conductive line.

Described also is an integrated circuit including a P-channel metal oxide semiconductor transistor including a source electrode, a drain electrode and a bulk tie. The integrated circuit further includes an N-channel metal oxide semiconductor transistor including a source electrode, a drain electrode and a bulk tie. The integrated circuit further includes a first conductive line coupled to the source electrode of the PMOS transistor. The integrated circuit further includes a second conductive line coupled to the source electrode of the NMOS transistor. The integrated circuit further includes a third conductive line coupled between the drain electrode of the PMOS transistor and the drain electrode of the NMOS transistor, wherein a resistance of one of the first conductive line and the second conductive line is at least 5 percent greater than a resistance of another of the first conductive line and second conductive line. The integrated circuit may have a further characterization by which a width of the one of the first conductive line and the second conductive line is less than a width of the another one of the first conductive line and the second conductive line. The integrated circuit may further include a first set of interconnect structures coupled to the one of the first conductive line and the second conductive line and a second set of interconnect structures coupled to the another of the first conductive line and the second conductive line, wherein a number of interconnect structures in the first set is less than a number of interconnect structures in the second set. The integrated circuit may have a further characterization by which the source electrode and the bulk tie of the PMOS or NMOS transistor coupled to the one of the first conductive line and the second conductive line are coupled to a first power supply. The integrated circuit may have a further characterization by which the source electrode of the PMOS or NMOS transistor coupled to the another of the first conductive line and the second conductive line is coupled to a second power supply.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Although the disclosure is described herein with reference to specific embodiments, various modifications and changes can be made without departing from the scope of the present disclosure as set forth in the claims below. For example, other layers than those shown may have variations to achieve the same effect. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. An integrated circuit, comprising:
a first transistor including a first current electrode, a second current electrode, and a bulk tie;
a second transistor including a first current electrode, a second current electrode, and a bulk tie, the second current electrode of the first transistor is connected to the first current electrode of the second transistor;
a first conductive line coupled between the first current electrode of the first transistor and a first supply voltage; and
a second conductive line coupled to the second current electrode of the second transistor and a second supply voltage, wherein a resistance of the second conductive line is at least 5 percent greater than a resistance of the first conductive line, wherein
the bulk tie of the first transistor is coupled to the first supply voltage, the bulk tie of the second transistor is coupled to a third supply voltage, the third supply voltage is different than the first and second supply voltage, and the first supply voltage is different than the second supply voltage.

2. The integrated circuit of claim 1, wherein the resistance of the second conductive line is at least 5 percent greater than the resistance of the first conductive line due to a width of the second conductive line being less than a width of the first conductive line.

3. The integrated circuit of claim 1, wherein the resistance of the second conductive line is at least 5 percent greater than the resistance of the first conductive line due to a number of conductive vias coupled to the second conductive line being less a number of conductive vias coupled to the first conductive line.

4. The integrated circuit of claim 1, wherein the second transistor is an N-channel metal oxide semiconductor, the first current electrode is a drain electrode, the second current electrode is a source electrode, and a magnitude of the first supply voltage is greater than a magnitude of the second supply voltage.

5. The integrated circuit of claim 1, wherein the first transistor is a P-channel metal oxide semiconductor, the first current electrode is a source electrode, the second current electrode is a drain electrode, and a magnitude of the first supply voltage is greater than a magnitude of the second supply voltage.

6. The integrated circuit of claim 1, wherein the first and second conductive lines are formed in a power metal layer of the integrated circuit.

7. The integrated circuit of claim 6, wherein the first and second conductive lines have a same thickness.

8. The integrated circuit of claim 1, further comprising:
a substrate;
active electronic device structures formed on the substrate; and
one or more interconnect layers coupled to the active electronic device structures, wherein
the first and second conductive lines are formed over the one or more interconnect layers.

9. The integrated circuit of claim 1, wherein a width of a conductive line coupled to the bulk tie of the second transistor is less than a width of the first conductive line and a width of the second conductive line.

10. An integrated circuit, comprising:
a P-channel metal oxide semiconductor (PMOS) transistor including a source electrode, a drain electrode and a bulk tie;
an N-channel metal oxide semiconductor (NMOS) transistor including a source electrode, a drain electrode and a bulk tie;
a first conductive line coupled to the source electrode of the PMOS transistor;
a second conductive line coupled between the source electrode of the NMOS transistor and a second supply voltage;
a third conductive line coupled between the drain electrode of the PMOS transistor and the drain electrode of the NMOS transistor, wherein
a resistance of the second conductive line is at least 5 percent greater than a resistance of the first conductive line, and
the bulk tie of the PMOS transistor is coupled to a first supply voltage, the bulk tie of the NMOS transistor is coupled to a third supply voltage, the third supply voltage is different than the first and second supply voltage, and the first supply voltage is different than the second supply voltage.

11. The integrated circuit of claim 10, wherein:
a width of the second conductive line is less than a width of the first conductive line.

12. The integrated circuit of claim 10, further comprising:
a first set of interconnect structures coupled to the first conductive line; and
a second set of interconnect structures coupled to the second conductive line, wherein
a number of interconnect structures in the first set is less than a number of interconnect structures in the second set.

13. The integrated circuit of claim 10, wherein:
the source electrode of the PMOS transistor is coupled to the first power supply.

* * * * *